(12) United States Patent  
Shneerson et al.

(10) Patent No.: US 8,146,109 B2  
(45) Date of Patent: Mar. 27, 2012

(54) VERSION RESILIENCY FOR A HOST APPLICATION AND CUSTOM CODE

(75) Inventors: Michael Shneerson, Redmond, WA (US); David A. Whitechapel, Seattle, WA (US); William A. Robertson, Redmond, WA (US); Pallavi Vajranabhaiah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1440 days.

(21) Appl. No.: 11/675,614

(22) Filed: Feb. 15, 2007

(65) Prior Publication Data

US 2008/0201691 A1   Aug. 21, 2008

(51) Int. Cl.  
G06F 9/44 (2006.01)

(52) U.S. Cl. .......................................... 719/328; 717/120

(58) Field of Classification Search .................. 717/120; 719/328  
See application file for complete search history.

(56) References Cited

U.S. PATENT DOCUMENTS

| | | | |
|---|---|---|---|
| 5,613,101 A | 3/1997 | Lillich | |
| 6,185,734 B1 | 2/2001 | Saboff et al. | |
| 6,519,767 B1 | 2/2003 | Carter et al. | |
| 6,658,659 B2 | 12/2003 | Hiller et al. | |
| 6,868,425 B1 | 3/2005 | Bergstraesser et al. | |
| 6,928,637 B2 | 8/2005 | Leherbauer et al. | |
| 6,996,817 B2 | 2/2006 | Birum et al. | |
| 7,055,147 B2 | 5/2006 | Iterum et al. | |
| 2002/0078262 A1 | 6/2002 | Harrison et al. | |
| 2003/0187929 A1 | 10/2003 | Pugh et al. | |
| 2003/0191870 A1 | 10/2003 | Duggan | |
| 2005/0055686 A1 | 3/2005 | Buban et al. | |
| 2005/0091672 A1* | 4/2005 | Debique et al. | 719/328 |
| 2006/0195820 A1 | 8/2006 | Curtis et al. | |
| 2006/0195836 A1 | 8/2006 | Lu et al. | |
| 2006/0282817 A1* | 12/2006 | Darst et al. | 717/106 |
| 2006/0294494 A1* | 12/2006 | Quinn et al. | 717/104 |

OTHER PUBLICATIONS

U.S. Appl. No. 11/675,616, Shneerson et al.  
Conradi, Reidar and Bernhard Westfechtel, "Version Models for Software Configuration Management," ACM Computing Surveys, vol. 30, No. 2, Jun. 1998, © 1998 ACM, pp. 232-282.  
Moise, Daniel L. et al., "Integrating a Reverse Engineering Tool with Microsoft Visual Studio.NET," Proceedings of the 8th European Conference on Software Maintenance and Reengineering (CSMR'04), © 2004 IEEE.  
Reynolds-Haertle, Robin, "CATfood, A Code Authoring Tool," OOPSLA'02, Nov. 4-8, 2002, Seattle, Washington, © 2002 ACM, pp. 40-41. Stubbs, Paul, "Let Users Customize Your Apps With Visual Studio Tools for Applications," from the Aug. 2006 issue of msdn magazine, http://msdn.microsoft.com/msdnmag/issues/06/08/AddInPower/default.aspx, [last accessed Dec. 17, 2007].  
Zdonik, Stanley B., "Object Management System Concepts," Proceedings of the 2nd ACM-SIGOA Conference on Office Information Systems, © 1984 ACM, pp. 13-19.

* cited by examiner

Primary Examiner — Charles E Anya  
(74) Attorney, Agent, or Firm — Perkins Coie LLP

(57) ABSTRACT

A method and architecture for increasing version resiliency between a host application that is unmanaged code and custom code that is managed code is provided. A host application exposes an application-level object and a document-level object. A custom code runtime provides a wrapper for the document-level object within the application domain of the custom code runtime. The custom code runtime also provides a mechanism within the application domain of the custom code runtime for providing to custom code a reference to the application-level object directly, rather than through a wrapper. Custom code can then access functionality of the application-level object directly using the reference without having to use a wrapper provided by the custom code runtime.

20 Claims, 2 Drawing Sheets

VERSION RESILIENCY FOR A HOST APPLICATION AND CUSTOM CODE

BACKGROUND

Developers of many application programs ("applications") implement the applications so that they can be customized by third parties. To customize an application, a third party develops custom code (e.g., add-ins and document-level customizations) that uses functionality exposed by the application. The custom code may improve the usability of the applications or provide additional functionality (e.g., domain-specific functionality). Such applications are referred to as "host applications" because the custom code is hosted within the process of the application. Developers of applications typically want to encourage the development of custom code for their applications to increase the demand for their applications. As a result, such developers may provide "custom code runtimes" that facilitate the development of custom code. A runtime is code that is loaded along with custom code and provides services to the custom code. These services may include higher-level functionality than that exposed by the application or may include domain-specific functionality. When an application is to load and start the execution of custom code, the application may load the runtime and direct the runtime to load and start the execution of the custom code.

Because of the ease of developing custom code as "managed code," many applications support the execution of custom code in the .NET Framework provided by Microsoft Corporation. The .NET Framework provides a common language runtime ("CLR") that provides high-level operating system type services to the managed programs (including custom code and applications) and serves as an execution engine for managed programs. The CLR ensures that managed programs do not take any unauthorized action. As such, the CLR acts as a "sandbox" within which managed programs execute. The CLR provides application domains ("appdomains") in which different managed programs can execute to help ensure that an errant managed program will not unduly affect the execution of another managed program.

In some environments, a host application may execute as unmanaged code, and custom code runtimes and custom code may execute as managed code. A host application provides the definition of the objects (e.g., Component Object Model ("COM") objects) that it exposes to the managed code via a primary interop assembly ("PIA"). A PIA provides a specification of the methods of the exposed objects along with the signature of the methods. A developer of managed code can access the objects exposed by the host application based on the specification provided by the PIA. The .NET Framework provides the support needed for invoking such an exposed object across the application domain of the host application executing as unmanaged code and the application domain of the managed code.

Custom code runtimes provide "wrappers" to objects exposed by the host application. These wrappers may hide some of the complexity of the exposed objects and may provide higher-level functionality that facilitates the development of custom code. The custom code runtimes may allow the custom code to access an exposed object only via the wrapper and not directly. The exposed objects that are wrapped by the custom code runtimes may include application-level objects and document-level objects. An application-level object is an object that provides general access to the exposed features of the host application that are not specific to manipulating a document. A document-level object, in contrast, is an object that provides access to the exposed features of the host application that are for manipulating a document. For example, an application-level object may expose a feature that allows managed code to add a window at the bottom of the window of the host application that displays scrolling stock prices. A document-level object may expose a feature that allows managed code to insert a value into the cell of an opened spreadsheet. A wrapper for a document-level object for a spreadsheet may allow cells of a spreadsheet to be bound to a data source. For example, each row of the spreadsheet may be bound to a record of a table of a database, and each column may be bound to different fields of the table. When a field of a record of the table is updated, the wrapper interacts with the document-level object to update the corresponding cell of the spreadsheet. Similarly, when a cell of the spreadsheet is updated, the wrapper is notified by the document-level object and updates a corresponding field in the database.

FIG. 1 illustrates an architecture that uses adapters for objects of unmanaged host applications. A host process 100 includes a host application 110, custom code 120, and a custom code runtime 130. The host application executes as unmanaged code, and both the custom code runtime and the custom code execute as managed code in separate application domains as indicated by application domain boundaries 101. The host application provides document-level object 111 and application-level object 112, and the custom code runtime provides wrappers 131 and 132. The custom code accesses the objects exposed by the host application via the wrappers.

A difficulty with such an architecture results when a host application and its custom code runtime are on different release cycles. If a new version of the host application is released that provides new functionality for an exposed object, the wrapper of the current version of the custom code runtime cannot access the new functionality of the exposed object. Nevertheless, existing custom code using the current version of the custom code runtime will likely continue to work correctly with the new version of the host application because host applications typically try to maintain such compatibility. For example, new functionality may be provided by new methods of an exposed object, rather than changing existing methods. The difficulty resulting from the different release cycles of the host application and custom code runtime is that a developer of custom code cannot release a new version of the custom code that takes advantage of the new functionality of the host application until a new version of the custom code runtime is released with a new version of the wrapper that exposes the new functionality through the wrapper. Thus, no custom code can be released to take advantage of the new functionality of the host application or any functionality of a new host application until after the next release of the custom code runtime with the new versions of wrappers for the new functionality or new wrappers for the functionality of the new host application.

SUMMARY

A method and architecture for increasing version resiliency between a host application that is unmanaged code and custom code that is managed code is provided. According to a version resiliency technique, a host application exposes an application-level object and a document-level object. The host application provides an instance of the document-level object of the host application within an application domain of the host application and an instance of an application-level object of the host application within an application domain of the host application. A custom code runtime provides an instance of wrapper for the document-level object within the application domain of the custom code runtime. The custom code runtime also provides a mechanism within the application domain of the custom code runtime for providing to custom code a reference to the application-level object. The version resiliency technique thus allows custom code to access functionality of the application-level object directly using the reference without having to use a wrapper provided by the custom code runtime.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and architecture for increasing version resiliency between a host application that is unmanaged code and custom code that is managed is provided. In one embodiment, according to the version resiliency technique, a host application exposes an application-level object and a document-level object. The host application provides an instance of the document-level object of the host application within an application domain of the host application and an instance of an application-level object of the host application within an application domain of the host application. The objects provide interfaces that are exposed to managed code for accessing the functionality of the host application. A custom code runtime provides an instance of wrapper for the document-level object within the application domain of the custom code runtime. The wrapper provides an interface between the document-level object and custom code. The custom code runtime also provides a mechanism within the application domain of the custom code runtime for providing to custom code a reference to the application-level object. For example, the reference may be a pointer to an interface exposed by the application-level object, which adheres to the Component Object Model. The version resiliency technique thus allows custom code to access functionality of the application-level object directly using the reference without having to use a wrapper provided by the custom code runtime. In this way, a developer of custom code can develop and release versions of the custom code that use new functionality of an application-level object provided by a new version of the host application without having to wait until a new release of the custom code runtime. However, because the custom code runtime provides a wrapper for the document-level object, custom code that uses new functionality exposed via the document-level object cannot be used until a new version of the custom code runtime with a wrapper that exposes that new functionality is released.

Figure 1:
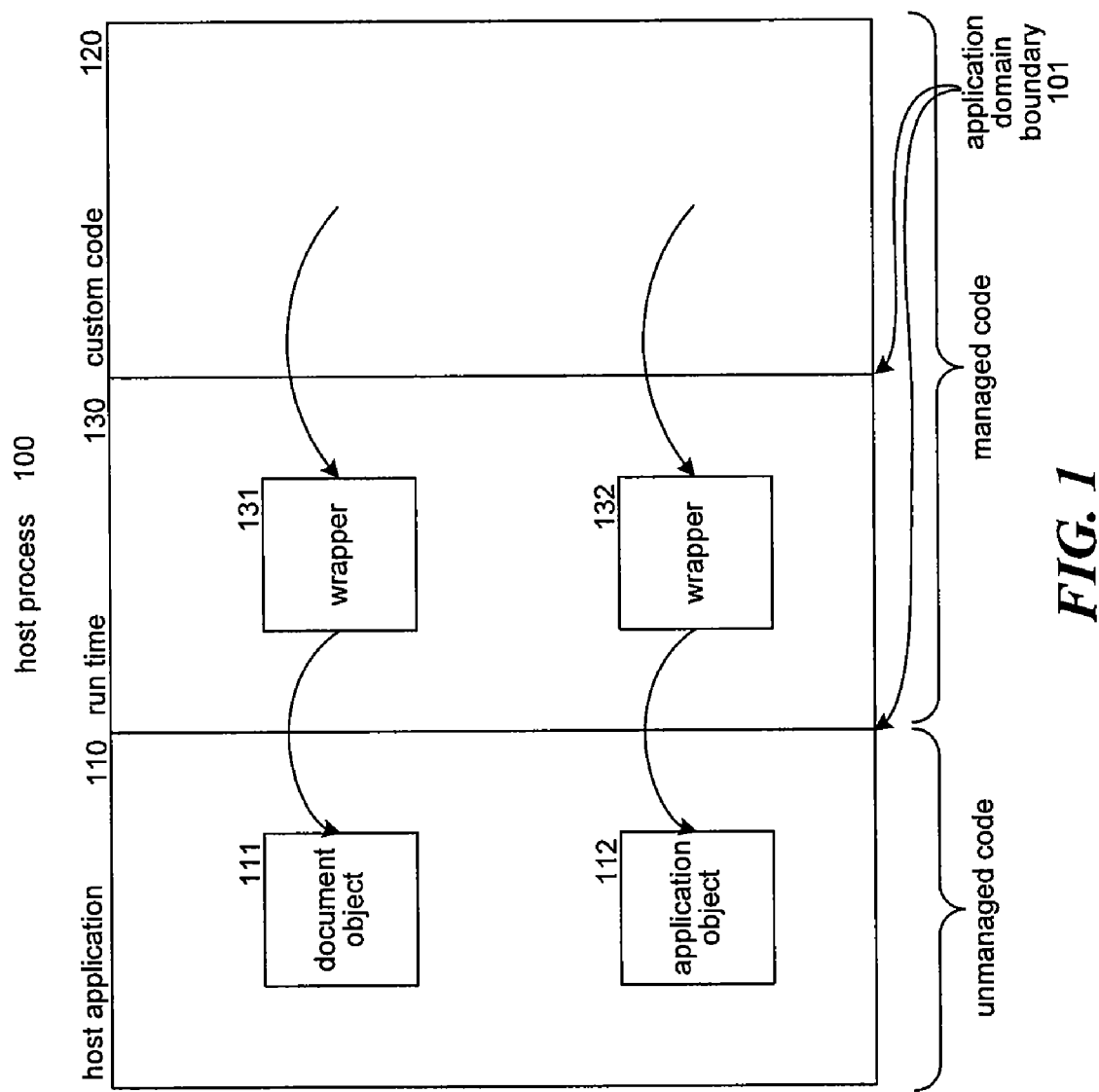
FIG. 1 illustrates an architecture that uses adapters for objects of unmanaged host applications.
Figure 2:
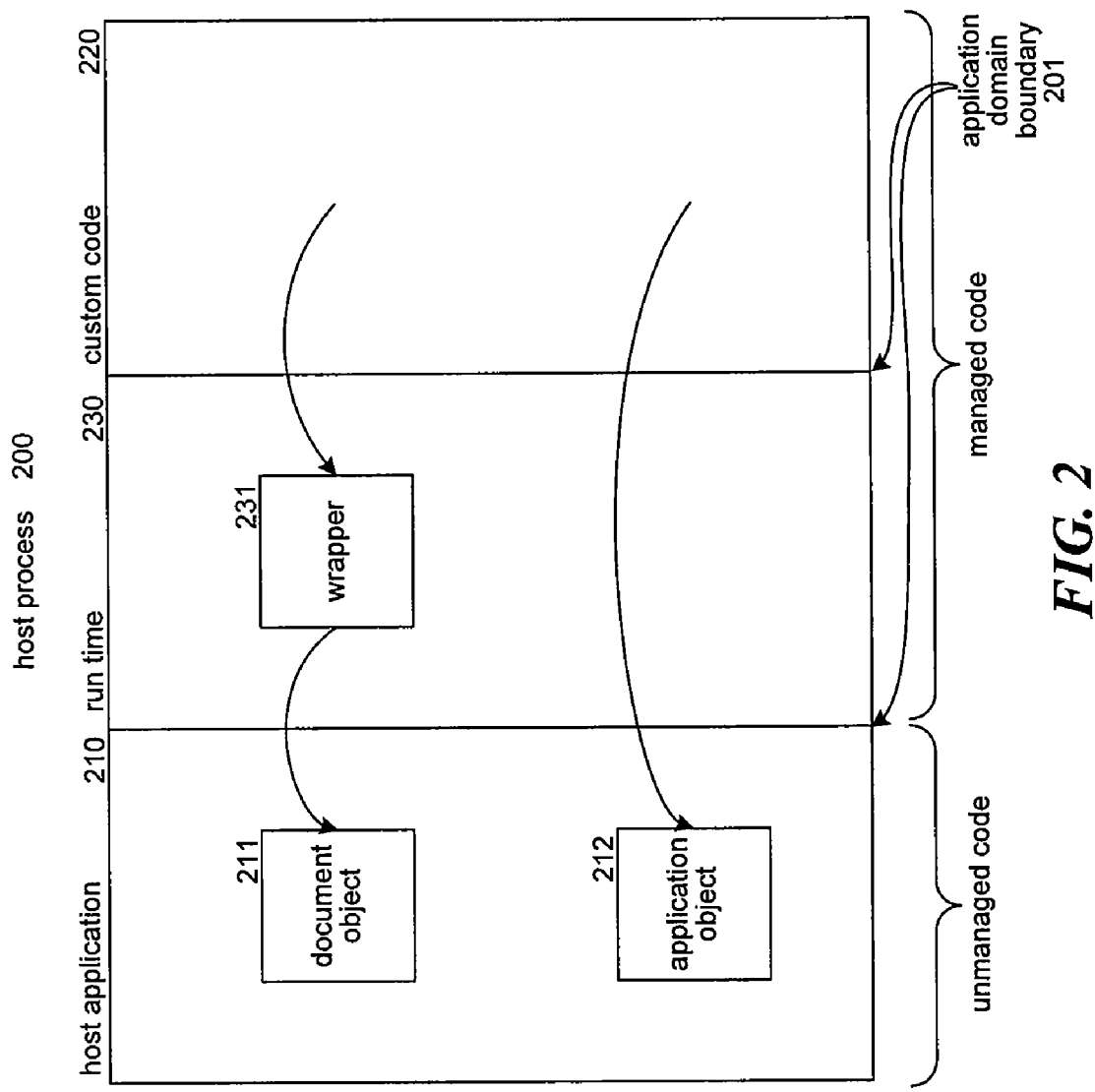
FIG. 2 illustrates an architecture that provides resiliency between a host application and custom code in one embodiment.

FIG. 2 illustrates an architecture that provides resiliency between a host application and custom code in one embodiment. A host process 200 includes a host application 210, custom code 220, and custom code runtime 230. The host application executes as unmanaged code, and both the custom code runtime and the custom code execute as managed code (e.g., in the .NET Framework) in separate application domains as indicated by application domain boundaries 201. The host application includes a document-level object 211 and an application-level object 212. The custom code runtime includes a wrapper 231 for the document-level object. The custom code accesses the document-level object via the wrapper. The custom code runtime, however, does not include a wrapper for the application-level object. Rather, the custom code runtime provides to the custom code a reference to the application-level object. As a result, the custom code can directly access the functionality of the application-level object without having to use a wrapper provided by the custom code runtime. Thus, the custom code can use new functionality exposed by the application-level object of a new version of the host application without having to wait for a new version of the custom code runtime to be released.

The computing devices on which the host application and custom code may be implemented may include a central processing unit, memory, input devices (e.g., keyboard and pointing devices), output devices (e.g., display devices), and storage devices (e.g., disk drives). The memory and storage devices are computer-readable media that may be embedded with computer-executable instructions that implement the host application and custom code. In addition, the instructions, data structures, and message structures may be stored or transmitted via a data transmission medium, such as a signal on a communications link.

The version resiliency technique may be used in conjunction with various computing systems or devices including personal computers, server computers, multiprocessor systems, microprocessor-based systems, network PCs, minicomputers, mainframe computers, distributed computing environments that include any of the above systems or devices, and the like. The host application and custom code may be used by various computing systems such as personal computers, cell phones, personal digital assistants, consumer electronics, home automation devices, and so on.

The host application and custom code may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The version resiliency technique may be used to increase version resiliency between host applications provided by Microsoft's Visual Studio Tools for Office and custom code developed for those host applications. Accordingly, the invention is not limited except as by the appended claims.

We claim:

1. A method for providing version resiliency between a host application that executes as unmanaged code and custom code runtime and custom code that execute as managed code, the host application exposing an application-level object and a document-level object, by a method comprising:

providing, for the custom code runtime, a wrapper for the document-level object exposed by the host application, wherein custom code can access the document-level object through the wrapper; and providing, for the custom code runtime, a mechanism for the custom code to access the application-level object directly without using a wrapper of the custom code runtime by the custom code runtime providing to the custom code a reference to the application-level object, wherein the custom code can access the application-level object, and wherein when a new version of the host application is released that exposes new functionality through the application-level object, a developer can release custom code that uses the new functionality with a version of the custom code runtime that was already released at the time the new version of the host application was released.

2. The method of claim 1 wherein the mechanism provides to the custom code a direct reference to the application-level object.

3. The method of claim 1 wherein a specification for the application-level object is provided by a primary interop assembly.

4. The method of claim 1 wherein when the new version of the host application provides new functionality that is exposed via the document-level object, new custom code that uses the functionality exposed via the document-level object cannot be used until a new version of the custom code runtime with a wrapper that exposes that new functionality is released.

5. The method of claim 1 wherein the exposed objects adhere to the Component Object Model.

6. The method of claim 1 wherein the managed code executes in the .NET Framework.

7. The method of claim 1 wherein the host application and the custom code runtime are on different release cycles.

8. A computer-readable memory storing computer-executable instructions for exposing functionality of objects of a host application executing as unmanaged code to custom code executing as managed code, the instructions comprising:
  an instance of a document-level object of the host application within an application domain of the host application, the object providing an interface that is exposed to managed code;
  an instance of an application-level object of the host application within an application domain of the host application, the object providing an interface that is exposed to managed code;
  an instance of wrapper for the document-level object within an application domain of the custom code runtime, the wrapper providing an interface between the document-level object and custom code; and
  a mechanism within the application domain of the custom code runtime for providing to custom code a reference to the application-level object, wherein the custom code can access functionality of the application-level object directly without having to use a wrapper provided by the custom code runtime and wherein when a new version of the host application is released that exposes new functionality through the application-level object, a developer can release custom code that uses the new functionality with a version of the custom code runtime that was already released at the time the new version of the host application was released.

9. The computer-readable memory of claim 8 wherein a specification for the application-level object is provided by a primary interop assembly.

10. The computer-readable memory of claim 8 wherein when a new version of the host application exposes new functionality via the application-level object, custom code that uses the new functionality can be released without having to wait for a new version of the custom code runtime.

11. The computer-readable memory of claim 8 wherein when a new version of the host application provides new functionality that is exposed via the document-level object, new custom code that uses the functionality exposed via the document-level object cannot be used until a new version of the custom code runtime with a wrapper that exposes that new functionality is released.

12. The computer-readable memory of claim 8 wherein the exposed objects adhere to the Component Object Model.

13. The computer-readable memory of claim 8 wherein the managed code executes in the .NET Framework.

14. The computer-readable memory of claim 8 wherein the host application and the custom code runtime are on different release cycles.

15. A computing device that exposes functionality of objects of a host application executing as unmanaged code to custom code executing as managed code, comprising:
  a memory storing computer-executable instructions of:
    a host application that includes an instance of a document-level object that provides an interface that is exposed to managed code and an instance of an application-level object that provides an interface that is exposed to managed code; and
    a custom code runtime that includes an instance of wrapper for the document-level object within an application domain of the custom code runtime, the wrapper providing an interface between the document-level object and custom code and that provides to custom code a reference to the application-level object, wherein the custom code can access functionality of the application-level object directly without having to use a wrapper provided by the custom code runtime and wherein when a new version of the host application is released that exposes new functionality through the application-level object, a developer can release custom code that uses the new functionality with a version of the custom code runtime that was already released at the time the new version of the host application was released; and
  a processor that executes the computer-executable instructions stored in the memory.

16. The computing device of claim 15 wherein a specification for the application-level object is provided by a primary interop assembly.

17. The computing device of claim 15 wherein when a new version of the host application exposes new functionality via the application-level object, custom code that uses the new functionality can be released without having to wait for a new version of the custom code runtime.

18. The computing device of claim 15 wherein when a new version of the host application provides new functionality that is exposed via the document-level object, custom code that uses the functionality exposed via the document-level object cannot be used until a new version of the custom code runtime with a wrapper that exposes that new functionality is released.

19. The computing device of claim 15 wherein the exposed objects adhere to the Component Object Model.

20. The computing device of claim 15 wherein the managed code executes in the .NET Framework.

* * * * *